Figure 1A:
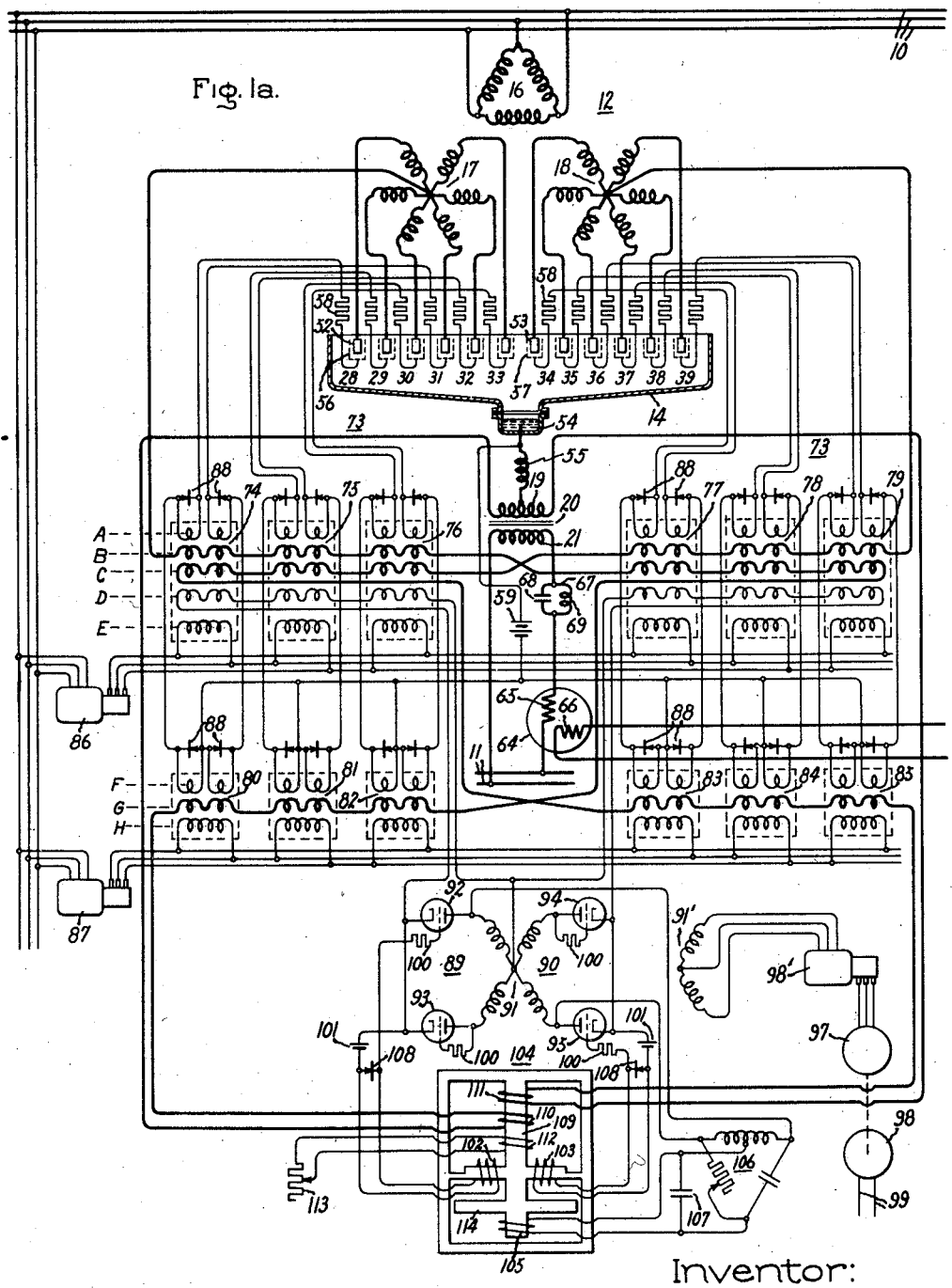

Oct. 15, 1940.  C. C. HERSKIND  2,218,383
ELECTRIC VALVE CONVERTING SYSTEM
Filed Sept. 16, 1939   2 Sheets-Sheet 2
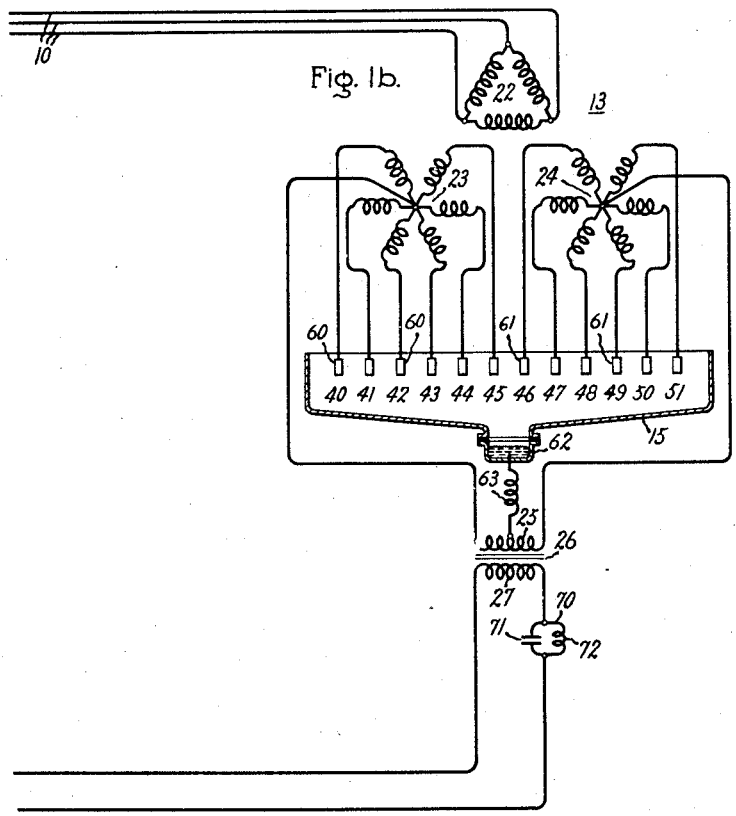
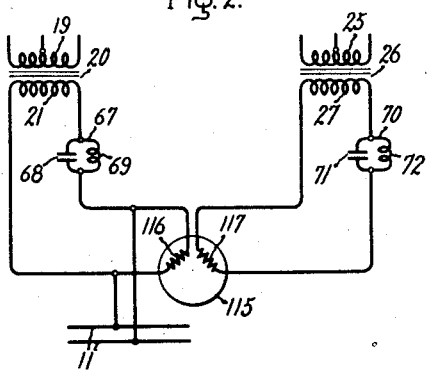
Inventor:
Carl C. Herskind,
by Harry E. Dunham
His Attorney.

Patented Oct. 15, 1940

2,218,383

UNITED STATES PATENT OFFICE 2,218,383

ELECTRIC VALVE CONVERTING SYSTEM

Carl C. Herskind, Schenectady, N. Y., assignor to General Electric Company, a corporation of New York Application September 16, 1939, Serial No. 295,318

10 Claims. (Cl. 172—281)

My invention relates to converting systems for transmitting energy between alternating current circuits of different frequencies and more particularly for transmitting energy from a higher frequency polyphase alternating current circuit to a lower frequency single phase alternating current circuit.

Electric valve frequency changers drawing power from a polyphase system and delivering power to a single phase system transmit the single phase pulsations through to the three phase system and it is necessary to provide means for eliminating this undesirable pulsation, since it appears in the polyphase system in the form of harmonic currents flowing from the frequency changer acting as a source. These harmonic currents are undesirable for several reasons among them being heating of the generator supplying the energy, heating of dynamo-electric machinery connected to the line and the causing of lamp flicker and telephone interference. Even when a single phase electric valve frequency changer which is not provided with any means for eliminating or reducing power pulsations is connected directly to a power system having a very large generating capacity in comparison with the size of the frequency changer, rotor heating of the generator due to the single phase pulsation results and the total load which may be carried is thereby reduced. Not only will losses be caused in the generator supplying the polyphase system, but connected apparatus such as synchronous motors, induction motors, and the like, will also have additional losses due to the harmonic currents flowing in the three phase system. Furthermore, these harmonic currents will induce corresponding harmonic voltages due to the system reactance and some of these harmonic voltages will cause very undesirable light flicker while others will produce radio and telephone interference.

Since a frequency changer delivering polyphase power will draw a steady load from a polyphase system, I provide an arrangement wherein are used two single phase frequency changers connected to the polyphase source and arranged to deliver two phase power at the frequency desired to a phase converter of either the shunt or series type which converts the two phase power to the desired single phase output thus eliminating the undesirable single phase pulsation in a polyphase alternating current supply. My invention therefore comprises an improved electric valve converting system for converting polyphase alternating current of one frequency to single phase alternating current of another frequency without producing an undesirable single phase pulsation in the polyphase circuit, and which will operate satisfactorily under widely variable load conditions.

It is an object of my invention, therefore, to provide a new and improved method and apparatus for frequency converting systems which will simplify the systems of the prior art and which will solve the above mentioned problems.

It is another object of my invention to provide a new and improved electric valve converting system.

It is a further object of my invention to provide a new and improved electric valve converting apparatus for transmitting energy between a polyphase alternating current circuit of one frequency and a single phase alternating current circuit of another frequency.

It is a still further object of my invention to provide a new and improved electric valve converting system for transmitting energy from a three phase alternating current circuit of one frequency to a single phase alternating current circuit of another frequency without producing a single phase pulsation in the three phase circuit.

In accordance with the illustrated embodiment of my invention a three phase alternating current circuit of one frequency is interconnected through a plurality of groups of electric discharge valves and a phase converter with a single phase alternating current circuit of a different frequency. Energy is transmitted from the three phase alternating current circuit through the several electric valves arranged as two single phase frequency changers so as to produce two single phase outputs 90 degrees out of phase; in other words, to transmit energy from a three phase alternating current supply circuit of one frequency to a two phase alternating current supply circuit of another frequency. The two phase output is supplied to a phase converter of either the series or shunt type from which a single phase output may be obtained without inducing undesirable harmonics in the polyphase alternating current supply circuit. A suitable excitation circuit is provided so that the electric valve frequency changer will operate under widely variable load conditions.

The novel features which I believe to be characteristic of my invention are set forth with particularity in the appended claims. My invention itself, however, will best be understood by reference to the following description taken in connection with the accompanying drawings in which Figs. 1a and 1b are, respectively, a first and second portion of a diagrammatic illustration of an electric valve converting apparatus embodying my invention, while Fig. 2 illustrates another modification of my invention.

Referring more particularly to Figs. 1a and 1b of the drawings, there is shown a system for transmitting energy from a three phase higher frequency alternating current circuit 10 to a single phase lower frequency alternating current load circuit 11. The circuits of different frequencies will be referred to hereinafter as the higher frequency circuit and the lower frequency circuit, respectively, but it is to be understood that the terms "higher" and "lower" are used only in a relative sense and that my invention is not limited to any particular order of magnitude for the frequencies of the respective circuits. The electric valve converting apparatus includes a pair of transformer banks 12 and 13 associated respectively with a pair of electric valve devices 14 and 15, each of these valve devices operating as single phase frequency changers as will be brought out in detail hereinafter. Transformer bank 12 is provided with a three phase primary network 16 connected to the supply circuit 10 and a pair of six phase star connected secondary networks 17 and 18 connected to supply opposite halves of the primary winding 19 of output transformer 20 having a secondary winding 21. Similarly, transformer bank 13 is provided with a three phase primary network 22 connected to the supply circuit 10 and a pair of six phase star connected secondary networks 23 and 24 connected to supply opposite halves of the primary winding 25 of an output transformer 26 having a secondary winding 27. The networks 17 and 18 supply their respective portions of the primary winding 19 of transformer 20 through a plurality of electric discharge paths or valves 28 to 39, respectively. Similarly, the networks 23 and 24 supply their respective portions of primary winding 25 of transformer 26 through a plurality of electric discharge paths or valves 40 to 51, respectively. These discharge paths or valves may be any of the several types well known in the art and may comprise a plurality of single anode, single cathode valves, or as illustrated in the drawings, they may comprise multi-anode single cathode vapor electric discharge devices 14 and 15. As illustrated in the drawings, the several phase terminals of the network 17 are connected to the anodes 52 associated with discharge paths 28 to 33, respectively, of electric valve device 14, while the electrical neutral of the network 17 is connected to one terminal of the primary winding 19 of transformer 20. The phase terminals of the network 18 are connected to the anodes 53 associated with discharge paths 34 to 39, respectively, of electric valve device 14, while its electrical neutral is connected to the other terminal of the primary winding 19 of transformer 20, the electrical neutral of primary winding 19 being connected to the cathode 54 of electric valve device 14 through a current smoothing reactance device 55. The groups of anodes 52 and 53 are provided with associated control electrodes or grids 56 and 57, respectively, connected to the cathode 54 of the discharge device 15 through current limiting resistors 58, appropriate windings of the grid transformers, which will be described more in detail hereinafter, and a negative bias battery 59. Similarly, the several phase terminals of the network 23 are connected to the anodes 60 associated with discharge paths 40 to 45, respectively, of valve device 15, while the electrical neutral of the network 23 is connected to one terminal of primary winding 25 of output transformer 26. The phase terminals of network 24 are connected to the anodes 61 associated with electric discharge paths 46 to 51, respectively, of electric valve device 15, while its electrical neutral is connected to the other terminal of the primary winding 25 of the transformer 26. The electrical neutral of primary winding 25 is connected to the cathode 62 of electric valve device 15 through a current smoothing reactance 63. As will be understood by those skilled in the art, the group of anodes 60 and 61 are also provided with associated control grids similar to those illustrated in Fig. 1a, but for the sake of simplicity the control circuits for electric valve device 15 have been omitted from the disclosure.

By suitable means the single phase outputs of transformers 20 and 26 are displaced in phase by 90 electrical degrees. As will be understood by those skilled in the art this phase displacement may be obtained in several different ways; for example, by zigzagging the secondary networks 23 and 24 without zigzagging the secondary networks 17 and 18. However, I prefer to obtain this phase displacement of 90 electrical degrees by means of grid control either advancing or retarding the phase of the grid excitation of electric valve device 14 relative to electric valve device 15. The lower frequency two phase output obtained from secondary windings 21 and 27 of transformers 20 and 26, respectively, are connected to a two phase converter 64 having a pair of windings 65 and 66 electrically displaced from one another by 90 electrical degrees. This phase converter may be one of the types of phase converters well known to those skilled in the art as for example, the phase converter disclosed in Fig. 1 of United States Letters Patent 1,300,543, granted April 15, 1919, upon an application of Ernst F. W. Alexanderson. Secondary winding 21 of transformer 20 is connected in series with wave trap filter 67, winding 65 and lower frequency load circuit 11. Wave trap filter 67 is illustrated as comprising a capacitor 68 and a reactor 69 connected in parallel and tuned to the frequency of one of the harmonics for example, the third harmonic, which it is desired to eliminate from the output circuit. Similarly, secondary winding 27 of transformer 26 is connected in series with wave trap filter 70 and winding 66 of phase converter 64. Wave trap filter 70 comprises a capacitor 71 and reactance 72 connected in parallel and tuned to the frequency of the particular harmonic which it is desired to eliminate from the load circuit 11. The phase balancer or phase converter 64 receives the two phase output from transformers 20 and 26, respectively, and converts it to the single phase power of load circuit 11. Phase or winding 65 of converter 64 is directly in series with the single phase load circuit 11 and a converter arranged as is phase converter 64 is often termed a series phase balancer or converter by those skilled in the art. Phase or winding 66, on the other hand, acts as a motor driving the converter 64 and supplying energy for phase 65 which acts as a generator. By this arrangement the single phase pulsation is completely eliminated from supply circuit 10.

In order to control the valve converting system so that the higher frequency alternating current from three phase circuit 10 may be converted to the lower frequency single phase alternating current of load circuit 11 under widely variable load conditions without causing the single phase pulsation to be impressed upon supply circuit 10 there is provided a control circuit for each of the valve devices 14 and 15. For simplicity of disclosure there is illustrated only the control circuit 73 for valve device 14 but it will be understood by those skilled in the art that an identical control circuit will be provided for valve device 15. A plurality of control transformers 74 to 79 inclusive, are included to provide rectifier excitation for the groups of electric valves of discharge paths 28 to 33 and 34 to 39, respectively, and a group of control transformers 80 to 85, inclusive, are included to provide inverter excitation for these discharge paths. Each of the control transformers 74 to 79, inclusive, is provided with five groups of windings; the A windings, which are the secondary or output windings for exciting the grids 56 and 57; the B windings, which are connected in series with the load circuit of the particular groups of valves which the transformers control; the C windings, which are connected in series with the load current of the other group of valves; the D windings, which are energized with a low frequency alternating potential to periodically and successively remove the rectifier excitation; and the E windings, which are the main primary windings of the control transformers and are energized from the alternating current supply circuit 10 through any suitable phase shifting arrangement such as rotary phase shifting transformer 86.

Similarly the inverter excitation transformers 80 to 85, inclusive, are provided with secondary or output windings F connected to the proper control grids 56 and 57; the windings G connected in series with the current transmitted by the valves which the transformers control; and the windings H which are the primary or excitation windings energized from the alternating current supply circuit 10 through a suitable phase adjusting means such as rotary phase shifting transformer 87.

It will be noted that the windings A and F are connected in series and that each pair of windings A—F is connected to the grid associated with the anode which is connected to the particular phase terminal of the networks 17 or 18 corresponding to the phase from which the windings E and H of the control transformers are energized. Thus, each grid receives two components of higher frequency alternating potential, one a component of rectifier excitation approximately in phase, and the other, a component of inverter excitation approximately in phase opposition to the potential impressed upon its corresponding anode.

Unilaterally conductive devices, such as contact rectifiers 88 are preferably connected in parallel to each of the windings A and F to bypass the negative half cycles of control potentials from the grids. Each of the control transformers 74—85, inclusive, is preferably of the self-saturating type so that it will become saturated from the energization of the exciting windings E and H. The result is that alternating potentials of a peaked wave form are impressed upon the grids of the several discharge paths. The control transformers 74—85, inclusive, are also designed to become saturated by predetermined currents in other of their exciting windings, as will be explained in more detail hereinafter.

As explained above, the windings D on the control transformers 74—85, inclusive, are for the purpose of periodically and successively removing the rectifier excitation from the groups of control transformers 74, 75 and 76, and 77, 78 and 79. To this end they may be energized from an auxiliary electric valve rectifying circuit. In the particular converting circuit illustrated, the maximum duration of rectifier excitation corresponding to unity power factor on the output circuit of transformer 20 is somewhat less than 180 electrical degrees, referred to the output circuit. Under other power factor conditions the periods of rectifier excitation are shorter, so that the intervals during which rectifier excitation must be renewed are greater than 180 electrical degrees. This result may be obtained by energizing the windings D of the groups of transformers 74, 75, and 76 and 77, 78 and 79 from the auxiliary electric valve rectifying circuits 89 and 90, respectively. The rectifier 89 comprises two phases of a supply transformer network 91 and a pair of electric valves 92 and 93, while the rectifier 90 comprises two phases of the network 91 and electric valves 94 and 95. The network 91 may constitute the secondary network of a transformer having a primary network 91' connected to a source of alternating current of a frequency which it is desired to supply the load circuit 11. This source of alternating current is illustrated as generator 97 connected to primary network 91' through a phase shifting transformer 98'. Alternating current generator 97 is driven by means of a synchronous motor 98 at a frequency corresponding to that of load circuit 11 and synchronous motor 98 is energized from a suitable source of alternating current 99 and may be energized directly from load circuit 11 if load circuit 11 is connected to an independent source of electromotive force for determining its frequency.

Electric valves 93 and 94 may be simple rectifier valves or their grids may be connected to their anodes through current limiting resistors 100, as illustrated, to obtain an equivalent effect. The grids of electric valves 92 and 95, however, are connected to their respective cathodes through current limiting resistors 100, negative bias batteries 101 and secondary windings 102 and 103 of a transformer device 104, the primary winding 105 of which is energized from diametrically opposite terminals of the network 91 through any suitable phase adjusting means such as an impedance phase shifting circuit 106. A capacitor 107 may be connected across the phase shifting circuit 106 to compensate for the reactance of the transformer device 104 and contact rectifiers 108 may be connected across the windings 102 and 103, if desired, to shunt the negative half cycles of control potentials from the grids of electric valves 92 and 95.

It will be noted that the windings 102 and 103 are mounted on branches of the magnetic core of the device 104 having contracted or saturable sections, the result of which is to convert the potential impressed upon the primary winding 105 into alternating potentials of peaked wave form, a device well known in the art. The magnetic circuits of the windings 102 and 103 have a common magnetic path or core section 109 upon which are mounted windings 110 and 111 connected in series with the groups of anodes 52 and 53, respectively. The magnetic core section 109 is also provided with an additional winding 112 which is short circuited through a low impedance device or resistor 113 to short circuit any alternating component of a flux produced in the core section 109 by the windings 110 and 111. The magnetic core section upon which is mounted the primary winding 105 is provided with an air gap in order to concentrate the flux generated by the windings 110 and 111 in the magnetic core sections on which are mounted the windings 102 and 103. In addition the device 104 may be provided with a magnetic by-pass or shunt 114 in order to limit the exciting or magnetizing current when the core sections of the windings 102 and 103 are in a saturated condition. The above described control circuit 73 is not my invention but is described and broadly claimed in United States Letters Patent Reissue No. 20,493, granted September 7, 1937, upon an application of Burnice D. Bedford.

The operation of the power circuit of the electric valve converting apparatus embodying my invention will be briefly described with reference to Figs. 1a and 1b. If the control electrodes or grids 56 are energized with components of alternating potential of peaked wave form from their associated rectifier excitation transformers 74, 75 and 76 the network 17 together with the associated anodes 52 of the discharge device 14 will act as a half wave rectifier circuit supplying a half cycle of alternating current to the left-hand portion of the primary winding 19 of output transformer 20. If the circuit is operating under unity power factor conditions, substantially 180 electrical degrees later referred to the lower frequency output circuit of transformer 20, the rectifier excitation will be removed from the grids 56 and impressed upon the grids 57. The network 18 and its associated anodes 53 now operate as a half wave rectifier supplying current to the right-hand portion of the primary winding 19 of transformer 20 thus generating a half cycle of alternating current of opposite polarity in the output circuit of transformer 20. If the lower frequency alternating current output of transformer 20 is supplying a lagging power factor load the current will persist in the network 17 and its associated anodes 52 after the rectifier excitation has been removed from the grids 56. In order to prevent this current from continuing to flow in the last anode path acting as a rectifier which would tend to cause a short circuit in case of a moderately low frequency, the grids 56 receive a component of inverter excitation of peaked wave form which, when the rectifier excitation is removed, is effective to transfer the current between the several anodes 52 and thus maintain control over the various anode paths. During those portions of the cycle when the network 17 and its associated anodes 52 are operating as an inverter the rectifier excitation is delayed to the grids 57 associated with the anodes 53 connected to the network 18 to prevent the simultaneous flow of current of more than a predetermined value in one network and its associated anodes operating as a rectifier and in the other network and its associated anodes operating as an inverter, which would tend to produce a short circuit on the lower frequency output of valve device 14.

In a similar manner the valve device 15 also converts a three phase alternating current from load circuit 10 to lower frequency single phase alternating current supplied to transformer 26. By suitably controlling the grid excitation of valve device 15 the phase of the output of this converting apparatus is displaced 90 electrical degrees from the phase of the output of valve device 14 so that in effect higher frequency three phase alternating current from source 10 is converted to two phase lower frequency alternating current which is supplied to phase converter 64 whereby the two phase lower frequency output of valve devices 14 and 15 is converted to the lower frequency single phase alternating current of load circuit 11 without causing the single phase pulsations to be transmitted to supply circuit 10.

The operation of the control circuit 73 is set forth in great detail in the above mentioned reissue patent and will be only very briefly described hereinafter. The rectifier excitation for the groups of grids 56 and 57 is supplied from the winding A of the excitation transformers 74—79, inclusive, which are in turn excited by the primary windings E energized from the circuit 10 through a rotary phase-shifting transformer 86. The rectifier excitation is periodically removed from the groups of grids 56 and 57 by means of windings D of the groups of rectifier transformers 74, 75, 76 and 77, 78, 79, respectively. The windings D of each of these groups of rectifier excitation transformers are energized with unidirectional current impulses from the auxiliary rectifier circuits 89 and 90, respectively. These auxiliary rectifier units are energized through transformer 91—91' from a source of alternating potential 97 of a frequency which it is desired to supply to the load circuit 11. Electric valves 93 and 94 operate as simple half wave single phase rectifier circuits so that the windings D of the groups of transformers 74, 75, 76 and 77, 78, 79 are alternately energized with positive half cycles from the lower frequency source 97. These windings completely saturate the associated transformer so that when any of the windings D are energized no secondary voltages are produced in the corresponding secondary coils A and when this occurs the rectifier excitation is removed from the corresponding group of grids 56 and 57. By controlling the phase of the potential applied to primary winding 105 of the saturable transformer 104 by means of phase shifting circuit 106, electric valves 92 and 95 may be brought into operation so that rectifier excitation may be supplied to the groups of control electrodes or grids 56 and 57 for a proper portion of each cycle and this may be controlled by phase shifting circuit 106.

In order to compensate for the natural regulation characteristic of the apparatus, the several rectifier excitation transformers are provided with windings B connected in series with the output circuit of the network and associated anodes controlled by that particular group of transformers. In order that the networks 17, 18, 23, 24 and their associated anodes may act as inverters under reactive power factor conditions when the rectifier excitation is removed for a portion of each cycle, windings F are provided connected in series with the windings A. These windings are continuously excited by the windings H of saturable transformers 80 to 85, inclusive, and the phase of the alternating potentials impressed upon the windings H is controlled by means of rotary phase shifting transformer 87. The windings G are provided to give an effect similar to that of the windings B, i. e., to progressively advance the phase of the inverter excitation in accordance with the increase in load on the system.

Since one phase of the series phase converter 64 as described above is in series with the single phase load, the capacity of such a converter must be the same as the single phase load. In certain installations where it is desired to supply more than one single phase load it may be desirable to use the shunt phase converter and accordingly in Fig. 2 I have illustrated a modification of the embodiment of my invention illustrated in Figs. 1a and 1b. Only a portion of the frequency changing apparatus is illustrated in Fig. 2 and the parts corresponding to those illustrated in Figs. 1a and 1b are characterized by the same reference numerals. The two phase output of valve devices 14 and 15 which occur at the secondary windings 21 and 27 of transformers 20 and 26 are fed to the quarter phase windings of shunt phase converter 115, having windings 116 and 117 respectively. These windings are displaced from one another by 90 electrical degrees and winding 116 is connected in series with the secondary winding 21 of transformer 20. The winding 117 on the other hand, is connected in series with secondary winding 27 of transformer 26. Phase converter 115 converts the two phase output from valve devices 14 and 15 to the single phase alternating current of load circuit 11 without impressing a single phase pulsation upon supply circuit 10. As illustrated, load circuit 11 is connected in shunt with one of the phases 116 of phase converter 115, as distinguished from the series phase converter 64 of Fig. 1a wherein load circuit 11 is connected in series with one of the windings 65 of converter 64. Several single phase loads may be obtained from shunt converter 115. Any of the well known types of shunt converter may be utilized, for example, the shunt converter disclosed in Fig. 1 of United States Letters Patent 1,300,544, granted April 15, 1919, upon an application of Ernst F. W. Alexanderson.

The operation of the modification of my invention illustrated in Fig. 2 will be well understood by those skilled in the art in view of the detailed description included above with respect to Figs. 1a and 1b.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In a frequency changing system, a polyphase alternating current circuit of one frequency, a polyphase alternating current circuit of a different frequency, electric valve frequency converting apparatus interconnecting said polyphase circuits, a single phase alternating current circuit of the same frequency as said second mentioned alternating current circuit, and phase converting means interposed between said second mentioned polyphase circuit and said single phase circuit.

2. In a frequency changing system, a polyphase alternating current circuit of one frequency, a polyphase alternating current circuit of a different frequency and a different number of phases, electric valve frequency converting apparatus interconnecting said polyphase circuits, a single phase alternating current circuit of the same frequency as said second mentioned alternating current circuit, and phase converting means interposed between said second mentioned polyphase circuit and said single phase circuit.

3. In an electric valve converting system, a polyphase alternating current circuit of one frequency, a polyphase alternating current circuit of another frequency, an electric valve converting apparatus interconnecting said polyphase circuits, a phase converter for converting said second mentioned polyphase alternating current to single phase alternating current of the same frequency without impressing the single phase pulsation upon said first mentioned polyphase alternating current circuit.

4. In an electric valve converting system a polyphase alternating current circuit of one frequency, a polyphase alternating current circuit of another frequency and of a different number of phases, an electric valve converting apparatus interconnecting said polyphase circuits, a phase converter for converting said second mentioned polyphase alternating current to single phase alternating current of the same frequency so that a balanced load is maintained upon said first mentioned polyphase alternating current circuit.

5. In an electric valve converting system a higher frequency polyphase alternating current circuit, a lower frequency polyphase alternating current circuit of a different number of phases, an electric valve converting apparatus interconnecting said polyphase circuits, a phase converter for converting said lower frequency polyphase alternating current to single phase alternating current of said lower frequency without impressing said single phase pulsation upon said higher frequency polyphase alternating current circuit.

6. In an electric valve converting system a three phase alternating current circuit of one frequency, a two phase alternating current circuit of another frequency, an electric valve converting apparatus interconnecting said circuits, a phase converter for converting said two-phase alternating current to single phase alternating current of the same frequency without impressing said single phase pulsation upon said three phase alternating current circuit.

7. In an electric valve converting system, a polyphase alternating current circuit of one frequency, a polyphase alternating current circuit of another frequency, and of a different number of phases, an electric valve converting apparatus interconnecting said polyphase circuits, a series phase converter for converting said second mentioned polyphase alternating current to single phase alternating current of the same frequency so that a balanced load is maintained upon said first mentioned polyphase alternating current circuit.

8. In an electric valve converting system, a polyphase alternating current circuit of one frequency, a polyphase alternating current circuit of another frequency and of a different number of phases, an electric valve converting apparatus interconnecting said polyphase circuits, a shunt phase converter for converting said polyphase alternating current of said different frequency to single phase alternating current of the same frequency so that a balanced load is maintained upon said first mentioned polyphase alternating current circuit.

9. In an electric valve converting system, a polyphase alternating current circuit of one frequency, a polyphase alternating current circuit of another frequency and of a different number of phases, an electric valve converting apparatus interconnecting said polyphase circuits, said electric valve converting apparatus being provided with control circuits so that widely varying loads may be supplied therefrom, a phase converter for converting said second mentioned polyphase alternating current to single phase alternating current of the same frequency without impressing said single phase pulsations upon said first mentioned polyphase alternating current circuit.

10. In an electric valve converting system, a polyphase alternating current circuit of one frequency, an electric valve converting apparatus for converting said polyphase alternating current to single phase alternating current of a different frequency, a second electric valve converting apparatus for converting said polyphase alternating current to single phase alternating current of the same frequency as the first mentioned single phase alternating current but displaced in phase therefrom by 90 electrical degrees, means for impressing said single phase alternating currents displaced from one another by 90 electrical degrees upon a phase converter, and means for converting said currents to single phase alternating current without impressing said single phase pulsation upon said polyphase alternating current circuit.

CARL C. HERSKIND.